US011851338B2

(12) United States Patent
Martinez Franco et al.

(10) Patent No.: US 11,851,338 B2
(45) Date of Patent: *Dec. 26, 2023

(54) METHOD FOR FAST SYNTHESIS OF AN AFX-STRUCTURE ZEOLITE WITH A FAUJASITE SOURCE

(71) Applicant: IFP Energies nouvelles, Rueil-Malmaison (FR)

(72) Inventors: Raquel Martinez Franco, Rueil-Malmaison (FR); Bogdan Harbuzaru, Rueil-Malmaison (FR); Eric Llido, Rueil-Malmaison (FR); David Berthout, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 85 days.

This patent is subject to a terminal disclaimer.

(21) Appl. No.: 17/604,238

(22) PCT Filed: Apr. 14, 2020

(86) PCT No.: PCT/EP2020/060476
§ 371 (c)(1),
(2) Date: Oct. 15, 2021

(87) PCT Pub. No.: WO2020/212356
PCT Pub. Date: Oct. 22, 2020

(65) Prior Publication Data
US 2022/0194805 A1 Jun. 23, 2022

(30) Foreign Application Priority Data
Apr. 19, 2019 (FR) ........................ 1904196

(51) Int. Cl.
*C01B 39/48* (2006.01)
(52) U.S. Cl.
CPC .......... *C01B 39/48* (2013.01); *C01P 2002/72* (2013.01); *C01P 2004/03* (2013.01)
(58) Field of Classification Search
None
See application file for complete search history.

(56) References Cited

U.S. PATENT DOCUMENTS

| 4,508,837 | A | 4/1985 | Zones | |
|---|---|---|---|---|
| 5,194,235 | A | 3/1993 | Zones | |
| 2016/0023912 | A1* | 1/2016 | Goel | B01J 29/40 |
| | | | | 423/709 |
| 2016/0101415 | A1* | 4/2016 | Ji | B01J 37/10 |
| | | | | 423/700 |
| 2016/0137518 | A1* | 5/2016 | Rivas-Cardona | |
| | | | | B01D 53/8628 |
| | | | | 423/247 |
| 2018/0093259 | A1 | 4/2018 | Chen | |
| 2018/0093897 | A1 | 4/2018 | Chen | |

FOREIGN PATENT DOCUMENTS

| FR | 3064261 A1 | 9/2018 |
|---|---|---|
| FR | 3064262 A1 | 9/2018 |
| JP | 2016169139 A | 9/2016 |
| WO | 2016077667 A1 | 5/2016 |
| WO | 2017/087385 A1 | 5/2017 |
| WO | 2017200607 A1 | 11/2017 |
| WO | 2017202495 A1 | 11/2017 |
| WO | 2017/213762 A1 | 12/2017 |
| WO | 2019/048940 A1 | 3/2019 |

(Continued)

OTHER PUBLICATIONS

Feng, et al. "Synthesis and single crystal structure of an AFX-type magnesium aluminophosphate". Microporous and Mesoporous Materials. 50, 145-149 (2001). (Year: 2001).*
Martin Nuria et al. "Cage-based small-pore catalysts for NH3-SCR prepared by combining bulky organic structure directing agents with modified zeolites as reagents." Applied Catalysis B: Environmental, Elsevier, Amsterdam, NL, vol. 217, May 29, 2017 (May 29, 2017), pp. 125-136, DOI: 10.1016/J.APCATB.2017.05.082, ISSN: 0926-3373, XP085112832; abstract; p. 129, figure 4.
International Search Report for PCT/EP2019/062556 dated Aug. 1, 2019 with English translation (cited in copending U.S. Appl. No. 17/057,408, filed Nov. 20, 2020).
Song_Ho Lee et al."Zeolite synthesis in the presence of flexible diquaternary alkylammonium ions (C2H5)3N+(CH2)nN+(C2H5)3 with n=3-10 as structure-directing agents." Microporous and Mesoporous Materials 60, 2003, p. 237-249.

(Continued)

*Primary Examiner* — Sheng H Davis
(74) *Attorney, Agent, or Firm* — FITCH, EVEN, TABIN & FLANNERY, LLP

(57) ABSTRACT

The present invention relates to a process for the rapid synthesis of an AFX-structure zeolite comprising at least:

i) mixing, in an aqueous medium, a FAU-structure zeolite having an $SiO_{2\ (FAU)}/Al_2O_{3\ (FAU)}$ molar ratio of between 2.00 and 100, a nitrogen-containing organic compound R, at least one source of at least one alkali and/or alkaline-earth metal M of valence n, with the following molar composition:

$(SiO_{2\ (FAU)})/(Al_2O_{3\ (FAU)})$ between 2.00 and 100, $H_2O/(SiO_{2\ (FAU)})$ between 1 and 100, $R/(SiO_{2\ (FAU)})$ between 0.01 and 0.6, $M_{2/n}O/(SiO_{2(FAU)})$ between 0.005 and 0.45, wherein $SiO_{2\ (FAU)}$ denotes the amount of $SiO_2$ provided by the FAU zeolite and $Al_2O_{3\ (FAU)}$ denotes the amount of $Al_2O_3$ provided by the FAU zeolite, until a homogeneous precursor gel is obtained;

ii) hydrothermally treating said precursor gel obtained at the end of step i) under autogenous pressure at a temperature of between 120° C. and 250° C., for 4 to 12 hours.

20 Claims, 2 Drawing Sheets

(56) References Cited

FOREIGN PATENT DOCUMENTS

| | | |
|---|---|---|
| WO | 2019/224084 A1 | 11/2019 |
| WO | 2019/224086 A1 | 11/2019 |
| WO | 2019/224088 A1 | 11/2019 |

OTHER PUBLICATIONS

R.H. Archer et al., "Imidazolium structure directing agents in zeolite synthesis: Exploring guest/host relationships in the synthesis of SSZ-70."Microporous and Mesoporous Materials vol. 130, Issues 1-3, May 2010, pp. 255-265.

* cited by examiner

METHOD FOR FAST SYNTHESIS OF AN AFX-STRUCTURE ZEOLITE WITH A FAUJASITE SOURCE

CROSS-REFERENCE TO RELATED APPLICATIONS

This application is a U.S. national phase application filed under 35 U.S.C. § 371 of International Application No. PCT/EP2020/060476, filed Apr. 14, 2020, designating the United States, which claims priority from French Patent Application No. 19/04.196 filed Apr. 19, 2019, which are hereby incorporated herein by reference in their entirety for all purposes.

TECHNICAL FIELD

The present invention relates to a novel process for preparing an AFX-structure zeolite. This novel process makes it possible to carry out the synthesis of an AFX-structure zeolite by converting/transforming an FAU-structure zeolite under hydrothermal conditions. In particular, said novel process makes it possible to carry out the rapid synthesis of an AFX-structure zeolite starting from an FAU-structure zeolite used as a source of silicon and aluminium and a specific organic molecule or structuring agent comprising two quaternary ammonium functions, 1,6-bis(methylpiperidinium)hexane in the dihydroxide form thereof. Said AFX-structure zeolite obtained according to the process of the invention advantageously finds its application as a catalyst, adsorbent or separating agent.

PRIOR ART

Crystalline microporous materials, such as zeolites or silicoaluminophosphates, are solids that are extensively used in the petroleum industry as catalysts, catalyst supports, adsorbents or separating agents. Although many microporous crystalline structures have been discovered, the refining and petrochemical industry is constantly in search of novel zeolitic structures which have particular properties for applications such as the purification or separation of gases, the conversion of carbon-based species or the like.

AFX-structure zeolites include in particular the zeolite SSZ-16 and the zeotypes SAPO-56 and MEAPSO-56. AFX-structure zeolites have a three-dimensional system of pores delimited by eight tetrahedrons and are formed by two types of cages: gmelinite (GME cage) and a large AFT cage (~8.3×13.0 Å). Numerous methods for synthesizing AFX-structure zeolites, and in particular the zeolite SSZ-16, are known. The SSZ-16 zeolite was synthesized using nitrogen-containing organic species derived from 1,4-di(1-azoniabicyclo[2.2.2]octane)butyl dibromide type and with a crystallization time typically greater than 3 days (U.S. Pat. No. 4,508,837). Chevron Research and Technology Company prepared SSZ-16 zeolite in the presence of DABCO-Cn-diquat cations, where DABCO represents 1,4-diazabicyclo[2.2.2]octane and n is 3, 4 or 5 with a crystallization time typically greater than 3 days (U.S. Pat. No. 5,194,235). S. B. Hong et al. used the diquaternary alkylammonium ion Et6-diquat-n, where Et6-diquat represents N',N'-bis-triethylpentanediammonium and n is 5, as a structuring agent for the synthesis of the SSZ-16 zeolite with a formation time of the SSZ-16 zeolite of between 7 and 14 days (Micropor. Mesopor. Mat., 60 (2003) 237-249). Mention may also be made of the use of 1,3-bis(adamantyl)imidazolium cations as a structuring agent for the preparation of AFX-structure zeolite with a crystallization time of between 7 and 10 days and generally of between 2 and 15 days, respectively (R. H. Archer et al., Microp. Mesopor. Mat., 130 (2010) 255-265; Johnson Matthey Company WO2016077667A1). Inagaki Satoshi et al. (JP2016169139A) used divalent N,N,N',N'-tetraalkylbicyclo[2.2.2]oct-7-ene-2,3:05,6-dipyrrolidium cations substituted with alkyl groups with a crystallization time generally of between 20 and 400 hours to prepare the SSZ-16 zeolite. Chevron U.S.A. (WO2017/200607 A1) proposes to carry out the synthesis of an SSZ-16 zeolite with a crystallization time of from 1 to 28 days using the dications:

1,1'-(1,4-cyclohexylenedimethylene)bis[1-methylpiperidinium], 1,1'-(1,4-cyclohexylenedimethylene)bis[1-ethylpiperidinium]

1,1'-(1,4-cyclohexylenedimethylene)bis[1-methylpyrrolidinium], 1,1'-(1,4-cyclohexylenedimethylene)bis[1-ethylpyrrolidinium]. H.-Y. Chen et al. (Johnson Matthey Company, US2018/0093897) used a mixture of cations containing at least 1,3-bis(adamantyl)imidazolium and a neutral amine to prepare the AFX-structure JMZ-10 zeolite in the absence of alkali metal cations, with a crystallization time of between 1 and 20 days. H.-Y. Chen et al. (Johnson Matthey Company, US2018/0093259) used a mixture of cations containing an organic molecule chosen from 1,3-bis(adamantyl)imidazolium, N,N-dimethyl-3,5-dimethylpiperidinium, N,N-diethyl-cis-2,6-dimethylpiperidinium, N,N,N-1-trimethyladamantylammonium, N,N,N-dimethylethylcyclohexylammonium and at least one alkaline-earth metal cation to obtain the AFX-structure JMZ-7 zeolite which bears close Al sites compared to a zeolite obtained by a synthesis using alkali metal cations. The time required to obtain this zeolite varies from 3 to 15 days.

K. G. Strohmaier et al. (Exxon Mobil, WO2017202495A1) used the organic molecule 1,1'-(hexane-1,6-diyl)bis(1-methylpiperidinium) in the presence of a metal complex stabilized by amine ligands to obtain an AFX-structure zeolite with a crystallization time ranging from 1 day to about 100 days.

Surprisingly, the applicant has discovered that it was possible to shorten the crystallization time by starting from a FAU-type zeolite as a source of silica and alumina, in the presence of a particular structuring agent, 1,6-bis(methylpipe ridinium)hexane in the dihydroxide form thereof, and with particular conditions in order to obtain, by rapid synthesis, a high purity AFX zeolite.

SUMMARY OF THE INVENTION

The invention relates to a process for preparing an AFX-structure zeolite comprising at least the following steps:

i) mixing, in an aqueous medium, a FAU-structure zeolite having an $SiO_2$ $_{(FAU)}/Al_2O_3$ $_{(FAU)}$ molar ratio of between 2.00 and 100, a nitrogen-containing organic compound R, R being 1,6-bis(methylpiperidinium) hexane dihydroxide, at least one source of at least one alkali and/or alkaline-earth metal M of valence n, n being an integer greater than or equal to 1, chosen from lithium, potassium, sodium, magnesium and calcium and the mixture of at least two of these metals, the reaction mixture having the following molar composition:

$(SiO_2$ $_{(FAU)})/(Al_2O_3$ $_{(FAU)})$ between 2.00 and 100, preferably between 5.00 and 99

H$_2$O/(SiO$_2$ $_{(FAU)}$) between 1 and 100, preferably between 5 and 60

R/(SiO$_2$ $_{(FAU)}$) between 0.01 and 0.6, preferably between 0.1 and 0.4

M$_{2/n}$O/(SiO$_2$ $_{(FAU)}$) between 0.005 and 0.45, preferably between 0.07 and 0.22 wherein SiO$_2$ $_{(FAU)}$ denotes the amount of SiO$_2$ provided by the FAU zeolite and Al$_2$O$_3$ $_{(FAU)}$ denotes the amount of Al$_2$O$_3$ provided by the FAU zeolite, until a homogeneous precursor gel is obtained;

ii) hydrothermally treating said precursor gel obtained at the end of step i) under autogenous pressure at a temperature of between 120° C. and 250° C., for a time of between 4 hours and 12 hours.

Advantageously, M is sodium, and preferably, the source of at least one alkali and/or alkaline-earth metal M is sodium hydroxide.

The reaction mixture of step i) may comprise at least one additional source of an XO$_2$ oxide, X being one or more tetravalent elements chosen from the group formed by the following elements: silicon, germanium, titanium, such that the XO$_2$/SiO$_2$ $_{(FAU)}$ molar ratio is between 0.001 and 33, and preferably between 0.001 and 15, the SiO$_2$ $_{(FAU)}$ content in said ratio being the content provided by the FAU-structure zeolite.

The reaction mixture of step i) advantageously has the following molar composition:

(XO$_2$+SiO$_2$ $_{(FAU)}$)/Al$_2$O$_3$ $_{(FAU)}$ between 2 and 100, preferably between 5.00 and 99

H$_2$O/(XO$_2$+SiO$_2$ $_{(FAU)}$) between 1 and 100, preferably between 5 and 60

R/(XO$_2$+SiO$_2$ $_{(FAU)}$) between 0.01 and 0.6, preferably between 0.1 and 0.4

M$_{2/n}$O/(XO$_2$+SiO$_2$ $_{(FAU)}$) between 0.005 and 0.45, preferably between 0.07 and 0.22

Preferably, X is silicon.

The reaction mixture of step i) may comprise at least one additional source of a Y$_2$O$_3$ oxide, Y being one or more trivalent elements chosen from the group formed by the following elements: aluminium, boron, gallium, such that the Y$_2$O$_3$/Al$_2$O$_3$ $_{(FAU)}$ molar ratio is between 0.001 and 45, and preferably between 0.001 and 40, limits included, the Al$_2$O$_3$ $_{(FAU)}$ content in said ratio being the content provided by the FAU-structure zeolite.

The reaction mixture of step i) advantageously has the following molar composition:

SiO$_2$ $_{(FAU)}$/(Al$_2$O$_3$(FAU)+Y$_2$O$_3$) between 2.00 and 100, preferably between 5.00 and 99

H$_2$O/(SiO$_2$ $_{(FAU)}$) between 1 and 100, preferably between 5 and 60

R/(SiO$_2$ $_{(FAU)}$) between 0.01 and 0.6, preferably between 0.1 and 0.4

M$_{2/n}$O/(SiO$_2$ $_{(FAU)}$) between 0.005 and 0.45, preferably between 0.07 and 0.22

SiO$_2$ $_{(FAU)}$ being the amount of SiO$_2$ provided by the FAU zeolite and Al$_2$O$_3$ $_{(FAU)}$ being the amount of Al$_2$O$_3$ provided by the FAU zeolite.

Preferably, Y is aluminium.

Advantageously, the precursor gel obtained at the end of step i) has a molar ratio of the total amount expressed as oxides of tetravalent elements to the total amount expressed as oxides of trivalent elements of between 2.00 and 100.

It is possible to add seed crystals of an AFX-structure zeolite to the reaction mixture of step i), preferably in an amount of between 0.01% and 10% of the total mass of the sources of said tetravalent and trivalent element(s) in anhydrous form present in the reaction mixture, said seed crystals not being taken into account in the total mass of the sources of the tetravalent and trivalent elements.

Step i) may comprise a step of maturing the reaction mixture at a temperature of between 20° C. and 80° C., with or without stirring, for a time of between 30 minutes and 24 hours, preferably between 1 hour and 12 hours.

The hydrothermal treatment of step ii) is advantageously carried out at a temperature of between 150° C. and 230° C., for a period of between 4 and 12 hours, upper limit excluded, preferably between 5 hours and 10 hours, more preferably between 5 hours and 8 hours.

Advantageously, the solid phase obtained at the end of step ii) is filtered off, washed, and dried at a temperature of between 20° C. and 150° C., preferably between 60° C. and 100° C., for a period of between 5 and 24 hours, to obtain a dried zeolite.

The dried zeolite may then be calcined at a temperature of between 450° C. and 700° C. for a period of between 2 and 20 hours, the calcination possibly being preceded by a gradual temperature increase.

The invention also relates to an AFX-structure zeolite having an SiO$_2$/Al$_2$O$_3$ ratio of between 4.00 and 100, preferably between 4.00 and 60, obtained by the preparation process described above.

The invention also relates to an AFX-structure calcined zeolite having an SiO$_2$/Al$_2$O$_3$ ratio of between 4.00 and 100, obtained by the preparation process described above, for which the mean d$_{hkl}$ values and relative intensities measured on an X-ray diffraction pattern are as follows:

TABLE 1

| 2 theta (°) | d$_{hkl}$ (Å) | I$_{rel}$ |
|---|---|---|
| 7.46 | 11.84 | vw |
| 8.72 | 10.14 | S |
| 11.68 | 7.57 | VS |
| 12.95 | 6.83 | S |
| 14.97 | 5.92 | vw |
| 15.62 | 5.67 | w |
| 17.47 | 5.07 | w |
| 17.99 | 4.93 | m |
| 19.50 | 4.55 | vw |
| 19.81 | 4.48 | w |
| 20.35 | 4.36 | S |
| 21.80 | 4.07 | VS |
| 22.23 | 3.99 | vw |
| 22.54 | 3.94 | vw |
| 23.78 | 3.74 | w |
| 24.05 | 3.70 | vw |
| 26.06 | 3.42 | mw |
| 26.92 | 3.31 | vw |
| 27.16 | 3.28 | vw |
| 27.54 | 3.24 | vw |
| 28.17 | 3.16 | mw |
| 28.63 | 3.12 | vw |
| 30.19 | 2.96 | w |
| 30.52 | 2.93 | mw |
| 31.12 | 2.87 | vw |
| 31.54 | 2.83 | mw |
| 31.84 | 2.81 | vw |
| 32.64 | 2.74 | vw |
| 33.82 | 2.65 | S |
| 34.24 | 2.62 | vw |
| 34.70 | 2.58 | w |
| 35.29 | 2.54 | vw | where VS=very strong; S=strong; m=moderate; mw=moderately weak; w=weak; vw=very weak. The relative intensity I$_{rel}$ is given in relation to a relative intensity scale in which a value of 100 is attributed to the most intense line in the X-ray diffraction pattern: vw<15; 15≤w<30; 30≤mw<50; 50≤m<65; 65≤S<85; VS≥85.

LIST OF FIGURES

Other features and advantages of the process according to the invention will become apparent on reading the following description of nonlimiting exemplary embodiments, with reference to the appended figures described below.

DESCRIPTION OF THE EMBODIMENTS

Figure 1:
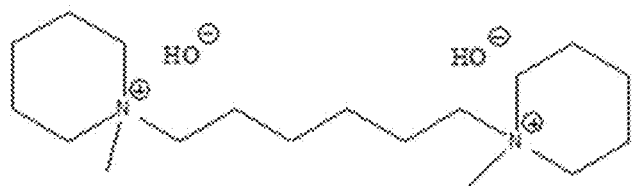
FIG. 1 represents the chemical formula of the nitrogen-containing organic compound used as structuring agent in the synthesis process according to the invention.

One subject of the present invention is a novel process for preparing an AFX-structure zeolite, by converting/transforming an FAU-structure zeolite having a particular $SiO_2/Al_2O_3$ ratio, under hydrothermal conditions, in the presence of a specific nitrogen-containing organic compound or structuring agent, 1,6-bis(methylpiperidinium)hexane in the dihydroxide form thereof.

In particular, the applicant has discovered that the nitrogen-containing organic compound or structuring agent 1,6-bis(methylpiperidinium)hexane in the dihydroxide form thereof, mixed with an FAU-structure zeolite having an $SiO_{2\ (FAU)}/Al_2O_{3\ (FAU)}$ molar ratio between 2.00 and 100, used as a source of silicon and aluminium, in the presence or absence of an additional supply, within said mixture, of at least one source of at least one tetravalent $XO_2$ element, and/or of at least one source of at least one trivalent $Y_2O_3$ element, leads to the production of a precursor gel of an AFX-structure zeolite having a molar ratio of the total amount expressed as oxides of tetravalent elements to the total amount expressed as oxides of trivalent elements of between 2.00 and 100, then to the production of an AFX-structure zeolite of high purity, the total amount of oxides of tetravalent element representing the sum of the $SiO_2$ content originating from the FAU zeolite and the $XO_2$ content originating from the possible additional source of an $XO_2$ oxide in the case where at least one additional source of an $XO_2$ oxide is added, the total amount of oxides of trivalent element representing the sum of the $Al_2O_3$ content originating from the FAU zeolite and the $Y_2O_3$ content originating from the possible additional source of a $Y_2O_3$ oxide in the case where at least one additional source of a $Y_2O_3$ oxide is added. Any other crystalline or amorphous phase is generally and very preferentially absent from the crystalline solid consisting of the AFX-structure zeolite obtained at the end of the preparation process.

More precisely, one subject of the present invention is a novel process for preparing a zeolite enabling the rapid synthesis of an AFX-structure zeolite comprising at least the following steps:

i) mixing, in an aqueous medium, a FAU-structure zeolite having an $SiO_{2\ (FAU)}/Al_2O_{3\ (FAU)}$ molar ratio of between 2.00 and 100, a specific nitrogen-containing organic compound R, also referred to as structuring agent, 1,6-bis(methylpiperidinium)hexane dihydroxide, at least one alkali metal and/or one alkaline-earth metal M of valence n, n being an integer greater than or equal to 1, the mixture having the following molar composition:

$(SiO_{2\ (FAU)})/(Al_2O_{3\ (FAU)})$ between 2.00 and 100, preferably between 5.00 and 99

$H_2O/(SiO_{2\ (FAU)})$ between 1 and 100, preferably between 5 and 60

$R/(SiO_{2\ (FAU)})$ between 0.01 and 0.6, preferably between 0.1 and 0.4

$M_{2/n}O/(SiO_{2\ (FAU)})$ between 0.005 and 0.45, preferably between 0.07 and 0.22 wherein $SiO_{2\ (FAU)}$ is the amount of $SiO_2$ provided by the FAU zeolite, and $Al_2O_{3\ (FAU)}$ is the amount of $Al_2O_3$ provided by the FAU zeolite, $H_2O$ is the molar amount of water present in the reaction mixture, R is the molar amount of said nitrogen-containing organic compound, $M_{2/n}O$ is the molar amount expressed in oxide form $M_{2/n}O$ for the source of alkali metal and/or alkaline-earth metal and M is one or more alkali and/or alkaline-earth metals chosen from lithium, sodium, potassium, calcium, magnesium and the mixture of at least two of these metals, very preferably M is sodium, step i) being carried out for a time that makes it possible to obtain a homogeneous mixture referred to as precursor gel;

ii) hydrothermally treating said precursor gel obtained at the end of step i) under autogenous pressure at a temperature of between 120° C. and 250° C., for a time of between 4 hours and 12 hours, until said AFX-structure zeolite forms.

One advantage of the present invention is therefore to provide a novel preparation process enabling the rapid formation of a high-purity AFX-structure zeolite from an FAU-structure zeolite, said process being carried out in the presence of an organic structuring agent, 1,6-bis(methylpiperidinium)hexane dihydroxide.

As FAU sources having an $SiO_2/Al_2O_3$ ratio between 2.00 and 6.00, mention may be made of the commercial zeolites CBV100, CBV300, CBV400, CBV500 and CBV600 produced by Zeolyst and the commercial zeolites HSZ-320NAA, HSZ-320HOA and HSZ-320HUA produced by TOSOH. The starting FAU-structure zeolite having an $SiO_2/Al_2O_3$ molar ratio of between 6.00 (limit included) and 200 may be obtained by any method known to those skilled in the art, such as for example by steam treatment (steaming) and acid washes on an FAU-structure zeolite having an $SiO_2/Al_2O_3$ molar ratio of less than 6.00. As FAU sources having an $SiO_2/Al_2O_3$ ratio greater than or equal to 6.00, mention may be made of the commercial zeolites CBV712, CBV720, CBV760 and CBV780 produced by Zeolyst and the commercial zeolites HSZ-350HUA, HSZ-360HUA and HSZ-385HUA produced by TOSOH. The starting FAU-structure zeolite can also be used in its sodium form or any other form or a partial or total exchange of the sodium cations with ammonium cations, optionally followed by a calcination step.

In the molar composition of the reaction mixture of step i) and throughout the description:

$XO_2$ denotes the molar amount of the additional tetravalent element(s) expressed in oxide form, and $Y_2O_3$ denotes the molar amount of the additional trivalent element(s) expressed in oxide form, $SiO_{2\ (FAU)}$ denotes the amount of $SiO_2$ provided by the FAU zeolite and $Al_2O_3(FAU)$ denotes the amount of $Al_2O_3$ provided by the FAU zeolite, $H_2O$ is the molar amount of water present in the reaction mixture, R is the molar amount of said nitrogen-containing organic compound, $M_{2/n}O$ is the molar amount expressed in oxide form $M_{2/n}O$ by the source of alkali metal and/or alkaline-earth metal.

In a preferred embodiment, the reaction mixture of step i) also comprises at least one additional source of an $XO_2$ oxide, such that the $XO_2/SiO_{2\ (FAU)}$ molar ratio is between 0.001 and 33, the mixture advantageously having the following molar composition:

$(XO_2 + SiO_{2\ (FAU)})/Al_2O_{3\ (FAU)}$ between 2.00 and 100, preferably between 5.00 and 99

$H_2O/(XO_2 + SiO_{2\ (FAU)})$ between 1 and 100, preferably between 5 and 60

$R/(XO_2 + SiO_{2\ (FAU)})$ between 0.01 and 0.6, preferably between 0.1 and 0.4

$M_{2/n}O/(XO_2 + SiO_{2\ (FAU)})$ between 0.005 and 0.45, preferably between 0.07 and 0.22 wherein X is one or more tetravalent elements chosen from the group formed by the following elements: silicon, germanium, titanium, preferably X is silicon, $SiO_{2\ (FAU)}$ being the amount of $SiO_2$ provided by the FAU zeolite, and $Al_2O_{3\ (FAU)}$ being the amount of $Al_2O_3$ provided by the FAU zeolite, R being 1,6-bis(methylpiperidinium)hexane dihydroxide, and M is one or more alkali and/or alkaline-earth metals chosen from lithium, sodium, potassium, calcium, magnesium and the mixture of at least two of these metals, very preferably M is sodium.

In another preferred embodiment, the reaction mixture of step i) also comprises at least one additional source of a $Y_2O_3$ oxide, such that the $Y_2O_3/Al_2O_{3\ (FAU)}$ molar ratio is between 0.001 and 45, the mixture advantageously having the following molar composition:

$SiO_{2\ (FAU)}/(Al_2O_3(FAU) + Y_2O_3)$ between 2.00 and 100, preferably between 5.00 and 99

$H_2O/(SiO_{2\ (FAU)})$ between 1 and 100, preferably between 5 and 60

$R/(SiO_{2\ (FAU)})$ between 0.01 and 0.6, preferably between 0.1 and 0.4

$M_{2/n}O/(SiO_{2\ (FAU)})$ between 0.005 and 0.45, preferably between 0.07 and 0.22 wherein Y is one or more trivalent elements chosen from the group formed by the following elements: aluminium, boron, gallium, preferably Y is aluminium, $SiO_{2\ (FAU)}$ being the amount of $SiO_2$ provided by the FAU zeolite, and $Al_2O_{3\ (FAU)}$ being the amount of $Al_2O_3$ provided by the FAU zeolite, R being 1,6-bis(methylpiperidinium)hexane dihydroxide, and M is one or more alkali and/or alkaline-earth metals chosen from lithium, sodium, potassium, calcium, magnesium and the mixture of at least two of these metals, very preferably M is sodium.

The source(s) of said tetravalent element(s) may be any compound comprising the element X and which can release this element in aqueous solution in reactive form.

When X is titanium, $Ti(EtO)_4$ is advantageously used as source of titanium.

In the preferred case in which X is silicon, the source of silicon may be any one of said sources commonly used for zeolite synthesis, for example powdered silica, silicic acid, colloidal silica, dissolved silica or tetraethoxysilane (TEOS). Among the powdered silicas, use may be made of precipitated silicas, especially those obtained by precipitation from a solution of alkali metal silicate, fumed silicas, for example Cab-O-Sil or Aerosil, and silica gels. Colloidal silicas having various particle sizes, for example a mean equivalent diameter of between 10 and 15 nm or between 40 and 50 nm, may be used, such as those sold under registered trademarks such as Ludox. Preferably, the source of silicon is Aerosil.

In accordance with the invention, Y may be one or more trivalent elements chosen from the group formed by the following elements: aluminium, boron, gallium, and is used in the mixture of step i). Preferably, Y is aluminium, such that the $Y_2O_3/Al_2O_3(FAU)$ molar ratio is between 0.001 and 45, and preferably between 0.001 and 40, the $Al_2O_{3\ (FAU)}$ content in said ratio being the content provided by the FAU-structure zeolite.

Adding at least one additional source of a $Y_2O_3$ oxide thus enables the $XO_2/Y_2O_3$ ratio of the precursor gel of an AFX-structure zeolite obtained at the end of step i) to be adjusted.

The source(s) of said trivalent element(s) Y may be any compound comprising the element Y and which can release this element in aqueous solution in reactive form. Element Y may be incorporated into the mixture in an oxidized form $YO_b$ with $1 \leq b \leq 3$ (b being an integer or a rational number) or in any other form. In the preferred case where Y is aluminium, the source of aluminium is preferably aluminium hydroxide or an aluminium salt, for example chloride, nitrate or sulfate, a sodium aluminate, an aluminium alkoxide, or alumina itself, preferably in hydrated or hydratable form, for instance colloidal alumina, pseudoboehmite, gamma-alumina or alpha or beta alumina trihydrate. Use may also be made of mixtures of the sources mentioned above.

The organic structuring agent R used is 1,6-bis(methylpiperidinium)hexane in the dihydroxide form thereof or a mixture of dihydroxide and dibromide forms with an OH/Br molar ratio >50. Preferably R is 1,6-bis(methylpiperidinium)hexane in the dihydroxide form thereof.

Step (i) of the process according to the invention consists in preparing an aqueous reaction mixture containing an FAU-structure zeolite, optionally a source of an $XO_2$ oxide or a source of a $Y_2O_3$ oxide, at least one nitrogen-containing organic compound R, R being 1,6-bis(methylpiperidinium) hexane dihydroxide, in the presence of at least one source of one or more alkali and/or alkaline-earth metals, in order to obtain a precursor gel of an AFX-structure zeolite. The amounts of said reagents are adjusted as indicated above so as to give this gel a composition that enables the crystallization of an AFX-structure zeolite.

The preparation process according to the invention thus makes it possible to adjust the $SiO_2/Al_2O_3$ ratio of the precursor gel containing an FAU-structure zeolite as a function of the chosen FAU-structure zeolite and of the optional additional supply, within the reaction mixture, of at least one source of at least one tetravalent element $XO_2$ and/or of at least one source of at least one trivalent element $Y_2O_3$.

It may be advantageous to add seeds of an AFX-structure zeolite to the reaction mixture during said step i) of the process of the invention so as to reduce the time needed for the formation of the crystals of an AFX-structure zeolite and/or the total crystallization time. Said seed crystals also promote the formation of said AFX-structure zeolite to the detriment of impurities. Such seeds comprise crystalline solids, in particular crystals of an AFX-structure zeolite. The seed crystals are generally added in a proportion of between 0.01% and 10% of the total mass of the sources of said tetravalent and trivalent element(s) in anhydrous form present in the reaction mixture, said seed crystals not being taken into account in the total mass of the sources of the tetravalent and trivalent elements. Said seeds are not taken into account either for determining the composition of the reaction mixture and/or of the gel, defined above, i.e. in the determination of the various molar ratios of the composition of the reaction mixture.

The mixing step i) is performed until a homogeneous mixture is obtained, preferably for a time of greater than or equal to 10 minutes, preferably with stirring by any system known to those skilled in the art, at a low or high shear rate.

At the end of step i), a homogeneous precursor gel is obtained.

It may be advantageous to perform a maturing of the reaction mixture during said step i) of the process of the invention, before the hydrothermal crystallization, so as to control the size of the crystals of an AFX-structure zeolite. Said maturing also promotes the formation of said AFX-structure zeolite to the detriment of impurities. The maturing of the reaction mixture during said step i) of the process of the invention may be performed at room temperature or at a temperature of between 20° C. and 80° C., with or without stirring, for a time advantageously of between 30 minutes and 24 hours.

In accordance with step (ii) of the process according to the invention, the precursor gel obtained at the end of step i) is subjected to a hydrothermal treatment under autogenous pressure, carried out at a temperature of between 120° C. and 250° C. for a time of between 4 hours and 12 hours, until said AFX-structure zeolite forms.

The precursor gel is advantageously placed under hydrothermal conditions under an autogenous reaction pressure, optionally by adding gas, for example nitrogen, at a temperature preferably of between 120° C. and 250° C., preferably between 150° C. and 230° C., until an AFX-structure zeolite has fully crystallized.

The time required to achieve crystallization varies between 4 hours and 12 hours, preferably less than 12 hours, preferably between 5 hours and 10 hours, and more preferably between 5 hours and 8 hours.

The reaction is generally performed with or without stirring, preferably with stirring. The stirring system that may be used is any system known to those skilled in the art, for example inclined blades with counter-blades, stirring turbomixers or Archimedes' screws.

At the end of the reaction, after performing said step ii) of the preparation process according to the invention, the solid phase formed from an AFX-structure zeolite is preferably filtered off, washed and then dried. The drying is generally performed at a temperature of between 20° C. and 150° C., preferably between 60° C. and 100° C., for a period of between 5 and 24 hours.

The dried zeolite may then advantageously be calcined. The calcined AFX-structure zeolite is generally analyzed by X-ray diffraction, this technique also making it possible to determine the purity of said zeolite obtained via the process of the invention.

Very advantageously, the process of the invention leads to the formation of an AFX-structure zeolite, free of any other crystalline or amorphous phase. The AFX zeolite obtained has a purity of greater than 90%, preferably greater than 95%, very preferably greater than 97% and even more preferably greater than 99.8%. Said AFX-structure zeolite, after the drying step, is then ready for subsequent steps such as calcination and ion exchange. For these steps, any conventional method known to those skilled in the art may be employed.

The loss on ignition of said AFX-structure zeolite obtained after drying and before calcination is generally between 5% and 18% by weight. According to the invention, loss on ignition (LOI) refers to the percentage loss in mass experienced by a solid compound, a mixture of solid compounds or a paste, in the case of the present invention preferably by said prepared AFX zeolite, during a heat treatment at 1000° C. for 2 hours, in a static furnace (of muffle furnace type), relative to the mass of the solid compound, of the mixture of solid compounds or of the paste in its initial form, in the case of the present invention preferably relative to the mass of the dried AFX zeolite that was tested. The loss on ignition corresponds in general to the loss of solvent (such as water) contained in the solids, but also to the removal of organic compounds contained in the mineral solid constituents.

The step of calcining an AFX-structure zeolite obtained according to the process of the invention is preferentially performed at a temperature of between 450° C. and 700° C. for a time of between 2 and 20 hours.

The AFX-structure zeolite obtained at the end of the calcining step is free of any organic species and in particular of the organic structuring agent R.

At the end of said calcining step, X-ray diffraction makes it possible to confirm that the solid obtained via the process according to the invention is indeed an AFX-structure zeolite. The purity obtained is preferably greater than 99.8%. In this case, the solid obtained has the X-ray diffraction pattern which includes at least the lines recorded in table 1. Preferably, the X-ray diffraction pattern does not contain any other lines of significant intensity (i.e. with an intensity greater than about three times the background noise) than those recorded in table 1.

This diffraction pattern is obtained by radiocrystallographic analysis by means of a diffractometer using the conventional powder method with the copper K$\alpha$1 radiation ($\lambda$=1.5406 Å). On the basis of the position of the diffraction peaks represented by the angle 2$\theta$, the lattice spacings $d_{hkl}$ characteristic of the sample are calculated using Bragg's law. The measurement error $\Delta(d_{hkl})$ on $d_{hkl}$ is calculated by means of Bragg's law as a function of the absolute error $\Delta(2\theta)$ assigned to the measurement of 2$\theta$. An absolute error $\Delta(2\theta)$ equal to ±0.02° is commonly accepted. The relative intensity $I_{rel}$ assigned to each value of $d_{hkl}$ is measured according to the height of the corresponding diffraction peak. The X-ray diffraction pattern of the AFX-structure crystalline solid according to the invention includes at least the lines at the $d_{hkl}$ values given in table 1. In the column of the $d_{hkl}$ values, the mean values of the inter-lattice spacings are given in angströms (Å). Each of these values must be assigned the measurement error $\Delta(d_{hkl})$ of between ±0.6 Å and ±0.01 Å.

The $SiO_2/Al_2O_3$ ratio of the AFX-structure zeolite is generally between 4.00 and 100, preferably between 4.00 and 60, very preferably between 6.00 and 60.

TABLE 2

| 2 theta (°) | $d_{hkl}$ (Å) | $I_{rel}$ |
| --- | --- | --- |
| 7.46 | 11.84 | vw |
| 8.72 | 10.14 | S |
| 11.68 | 7.57 | VS |
| 12.95 | 6.83 | S |
| 14.97 | 5.92 | vw |
| 15.62 | 5.67 | w |
| 17.47 | 5.07 | w |
| 17.99 | 4.93 | m |
| 19.50 | 4.55 | vw |
| 19.81 | 4.48 | w |

TABLE 2-continued

| 2 theta (°) | $d_{hkl}$ (Å) | $I_{rel}$ |
|---|---|---|
| 20.35 | 4.36 | S |
| 21.80 | 4.07 | VS |
| 22.23 | 3.99 | vw |
| 22.54 | 3.94 | vw |
| 23.78 | 3.74 | w |
| 24.05 | 3.70 | vw |
| 26.06 | 3.42 | mw |
| 26.92 | 3.31 | vw |
| 27.16 | 3.28 | vw |
| 27.54 | 3.24 | vw |
| 28.17 | 3.16 | mw |
| 28.63 | 3.12 | vw |
| 30.19 | 2.96 | w |
| 30.52 | 2.93 | mw |
| 31.12 | 2.87 | vw |
| 31.54 | 2.83 | mw |
| 31.84 | 2.81 | vw |
| 32.64 | 2.74 | vw |
| 33.82 | 2.65 | S |
| 34.24 | 2.62 | vw |
| 34.70 | 2.58 | w |
| 35.29 | 2.54 | vw | where VS=very strong; S=strong; m=medium; mw=moderately weak; w=weak; vw=very weak. The relative intensity Ire' is given in relation to a relative intensity scale in which a value of 100 is attributed to the most intense line in the X-ray diffraction pattern: vw<15; 15≤w<30; 30≤mw<50; 50≤m<65; 65≤S<85; VS≥85.

Table 1: Mean values of $d_{hkl}$ and relative intensities measured on an X-ray diffraction pattern of the calcined AFX-structure crystalline solid X-ray fluorescence spectrometry (XFS) is a chemical analysis technique using a physical property of the material, X-ray fluorescence. It enables the analysis of the majority of the chemical elements starting from beryllium (Be) in concentration ranges ranging from a few ppm to 100%, with precise and reproducible results. X-rays are used to excite the atoms in a sample, which makes them emit X-rays having an energy characteristic of each element present. The intensity and the energy of these X-rays are then measured to determine the concentration of the elements in the material.

It is also advantageous to obtain the protonated form of the AFX-structure zeolite obtained by the process according to the invention. Said protonated form may be obtained by performing an ion exchange with an acid, in particular a strong mineral acid such as hydrochloric, sulfuric or nitric acid, or with a compound such as ammonium chloride, sulfate or nitrate. The ion exchange may be performed by placing said AFX-structure zeolite in suspension one or more times with the ion-exchange solution. Said zeolite may be calcined before or after the ion exchange or between two ion-exchange steps. The zeolite is preferably calcined before the ion exchange, so as to remove any organic substance included in the porosity of the zeolite, since the ion exchange is thereby facilitated.

The AFX-structure zeolite obtained via the process of the invention may be used after ion exchange as acidic solid for catalysis in the fields of refining and petrochemistry. It may also be used as an absorbent or as a molecular sieve.

EXAMPLES

The invention is illustrated by the following examples, which are not in any way limiting.

Example 1: Preparation of 1,6-bis(methylpiperidinium)hexane dihydroxide (Structuring Agent R)

50 g of 1,6-dibromohexane (0.20 mol, 99%, Alfa Aesar) are placed in a 1 L round-bottom flask containing 50 g of N-methylpiperidine (0.51 mol, 99%, Alfa Aesar) and 200 mL of ethanol. The reaction medium is stirred and refluxed for 5 hours. The mixture is then cooled to room temperature and then filtered. The mixture is poured into 300 mL of cold diethyl ether and the precipitate formed is then filtered off and washed with 100 mL of diethyl ether. The solid obtained is recrystallized in an ethanol/ether mixture. The solid obtained is dried under vacuum for 12 hours. 71 g of a white solid are obtained (i.e. a yield of 80%).

The product has the expected $^1$H NMR spectrum. $^1$H NMR (D$_2$O, ppm/TMS): 1.27 (4H, m); 1.48 (4H, m); 1.61 (4H, m); 1.70 (8H, m); 2.85 (6H, 5), 3.16 (12H, m).

18.9 g of Ag$_2$O (0.08 mol, 99%, Aldrich) are placed in a 250 mL Teflon beaker containing 30 g of the prepared structuring agent 1,6-bis(methylpiperidinium)hexane dibromide (0.07 mol) and 100 mL of deionized water. The reaction medium is stirred for 12 hours in the absence of light. The mixture is then filtered. The filtrate obtained is composed of an aqueous solution of 1,6-bis(methylpiperidinium)hexane dihydroxide. Assaying of this species is performed by proton NMR using formic acid as standard.

Example 2: Preparation of an AFX-Structure Zeolite According to the Invention 33.37 g of an aqueous solution of 1,6-bis(methylpiperidinium)hexane dihydroxide (18.36% by weight) prepared according to example 1 are mixed with 37.15 g of deionized water, with stirring and at room temperature. 1.72 g of sodium hydroxide (98% by weight, Aldrich) are dissolved in the above mixture with stirring and at room temperature. As soon as the suspension obtained is homogeneous, 7.79 g of a FAU-structure zeolite (CBV720, SiO$_2$/Al$_2$O$_3$=33.52, Zeolyst, LOI=6.63%) begins to be poured in and the suspension obtained is kept stirring for 30 minutes at room temperature. In order to promote the formation of an AFX-structure zeolite, 0.646 g of seeds (10% relative to the mass of CBV720 zeolite) of an AFX-structure zeolite are added to the synthesis mixture and kept stirring for 5 minutes. The reaction mixture then undergoes a step of maturing for 24 hours at room temperature with stirring (200 rpm). The molar composition of the precursor gel is as follows: 1 SiO$_2$: 0.0298 Al$_2$O$_3$: 0.18R: 0.20 Na$_2$O: 34H$_2$O, i.e. an SiO$_2$/Al$_2$O$_3$ ratio of 33.52. The precursor gel is then transferred, after homogenization, into a 160 mL stainless steel reactor fitted with a stirring system with four inclined blades. The reactor is closed and then heated for 5 hours under autogenous pressure with an increase in temperature of 5° C./min up to 180° C. and with stirring at 200 rpm to allow the crystallization of the AFX-structure zeolite. The crystallized product obtained is filtered off, washed with deionized water and then dried overnight at 100° C. The loss on ignition of the dried solid is 14.82%. The solid is then introduced into a muffle furnace where a calcination step is performed: the calcination cycle comprises an increase in temperature of 1.5° C./min up to 200° C., a hold at 200° C. maintained for 2 hours, an increase of 1° C./min up to 550° C., followed by a hold at 550° C. maintained for 12 hours, then a return to room temperature.

Figure 2:
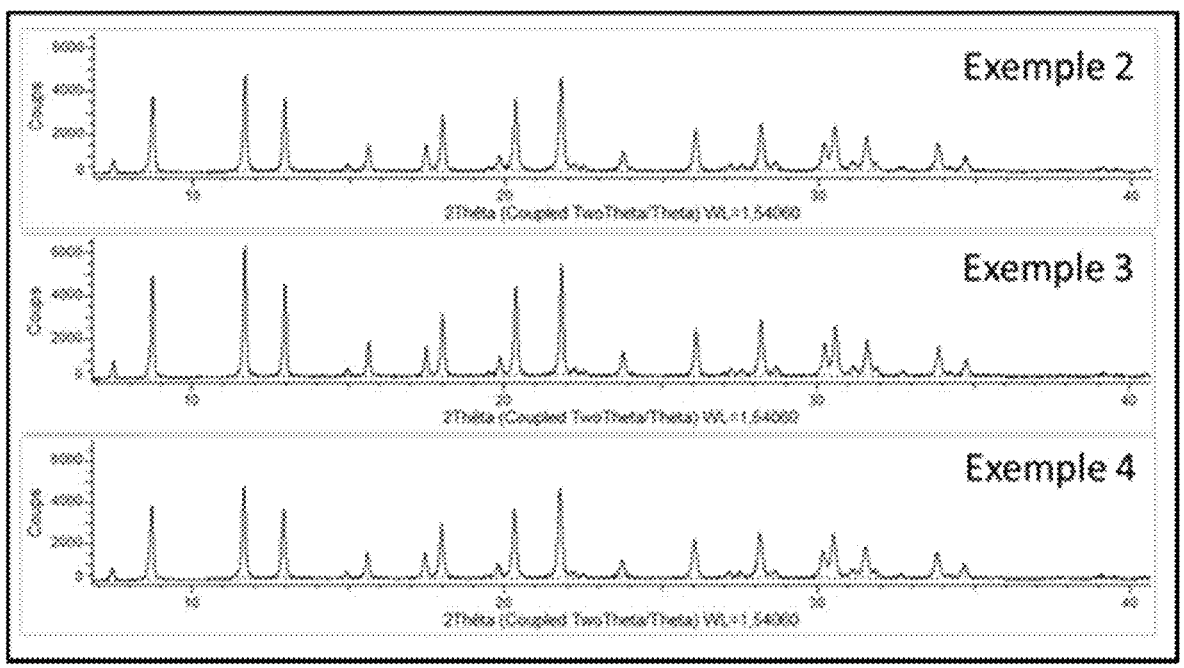
FIG. 2 represents the X-ray diffraction (XRD) pattern of the AFX zeolite obtained according to examples 2 to 4.
Figure 3:
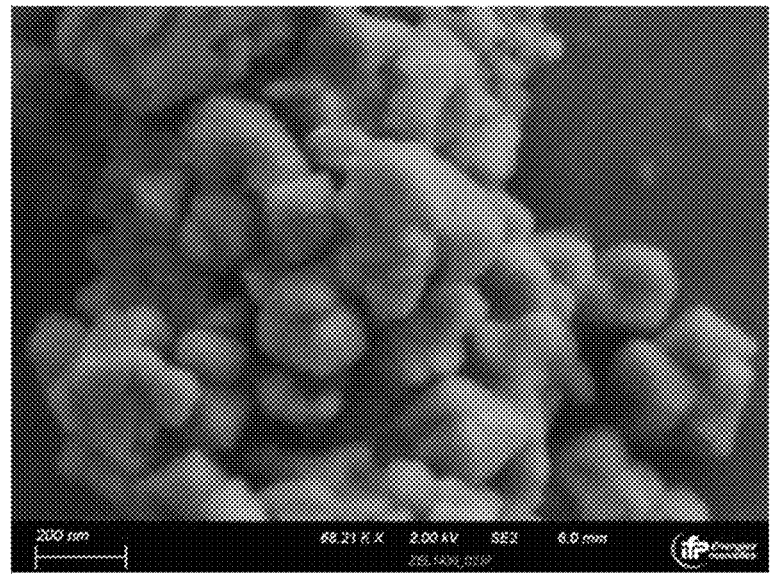
FIG. 3 represents an image obtained by scanning electron microscopy (SEM) of the AFX zeolite obtained according to example 2.

The calcined solid product was analysed by X-ray diffraction and identified as consisting of an AFX-structure zeolite with a purity of greater than 99% by weight. The X-ray diffraction pattern produced for the calcined solid is given in FIG. 2. The image obtained by scanning electron microscopy (SEM) of the calcined AFX-structure solid is given in FIG. 3. The product has an $SiO_2/Al_2O_3$ molar ratio of 11.42 as determined by XRF.

Example 3: Preparation of an AFX-Structure Zeolite According to the Invention 29.3 g of an aqueous solution of 1,6-bis(methylpiperidinium)hexane dihydroxide (18.36% by weight) prepared according to example 1 are mixed with 41.73 g of deionized water with stirring and at room temperature. 0.764 g of sodium hydroxide (98% by weight, Aldrich) are dissolved in the above mixture with stirring and at room temperature. 0.675 g of amorphous aluminium hydroxide gel (amorphous Al(OH)$_3$ gel, 58.55% by mass of Al$_2$O$_3$, Merck), corresponding to an Al$_2$O$_3$ (amorphous gel)/Al$_2$O$_3$ $_{(FAU)}$ molar ratio of 35.27, are subsequently incorporated into the synthesis mixture, which is kept stirring for half an hour at room temperature. As soon as the suspension obtained is homogeneous, 7.56 g of a FAU-structure zeolite (CBV780, SiO$_2$/Al$_2$O$_3$=98.22, Zeolyst, LOI=8.52%) begins to be poured in and the suspension obtained is kept stirring for 30 minutes at room temperature. In order to promote the formation of an AFX-structure zeolite, 0.614 g of seeds (10% relative to the mass of CBV780 zeolite) of an AFX-structure zeolite are added to the synthesis mixture, which is kept stirring for 5 minutes. The reaction mixture then undergoes a step of maturing for 24 hours at room temperature with stirring (200 rpm). The molar composition of the precursor gel is as follows: 1 SiO$_2$: 0.05 Al$_2$O$_3$: 0.167R: 0.093 Na$_2$O: 36.73H$_2$O, i.e. an SiO$_2$/Al$_2$O$_3$ ratio of 20. The precursor gel is then transferred, after homogenization, into a 160 mL stainless steel reactor fitted with a stirring system with four inclined blades. The reactor is closed and then heated for 5 hours under autogenous pressure with an increase in temperature of 5° C./min up to 180° C. and with stirring at 200 rpm to allow the crystallization of the AFX-structure zeolite. The crystallized product obtained is filtered off, washed with deionized water and then dried overnight at 100° C. The loss on ignition of the dried solid is 14.69%. The solid is then introduced into a muffle furnace where a calcination step is performed: the calcination cycle comprises an increase in temperature of 1.5° C./min up to 200° C., a hold at 200° C. maintained for 2 hours, an increase of 1° C./min up to 550° C., followed by a hold at 550° C. maintained for 12 hours, then a return to room temperature.

Figure 4:
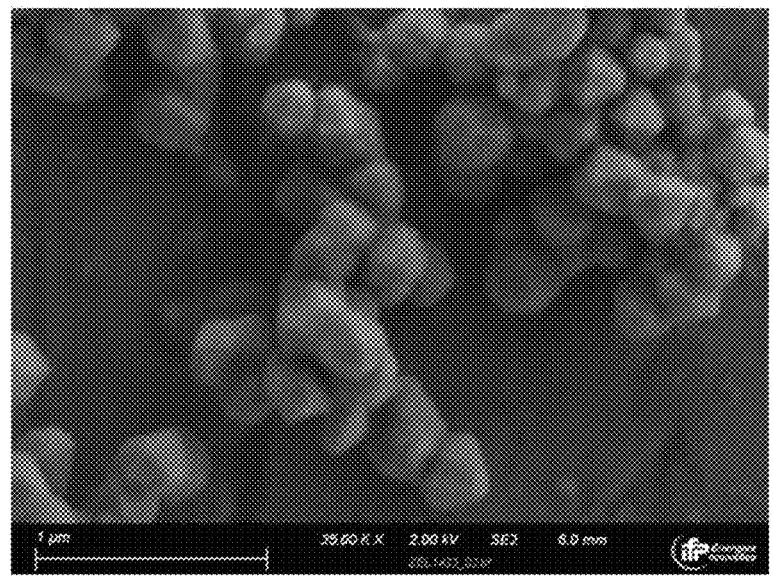
FIG. 4 represents an image obtained by scanning electron microscopy (SEM) of the AFX zeolite obtained according to example 3.

The calcined solid product was analysed by X-ray diffraction and identified as consisting of an AFX-structure zeolite with a purity of greater than 99% by weight. The X-ray diffraction pattern produced for the calcined solid is given in FIG. 2. The image obtained by scanning electron microscopy (SEM) of the calcined AFX-structure solid is given in FIG. 4. The product has an $SiO_2/Al_2O_3$ molar ratio of 14.05 as determined by XRF.

Example 4: Preparation of an AFX-Structure Zeolite According to the Invention 28.35 g of an aqueous solution of 1,6-bis(methylpiperidinium)hexane dihydroxide (18.36% by weight) prepared according to example 1 are mixed with 41.22 g of deionized water, with stirring and at room temperature. 1.26 g of sodium hydroxide (98% by weight, Aldrich) are dissolved in the above mixture with stirring and at room temperature. 5.74 g of Aerosil 380 silica (100% by weight, Degussa) are then poured in in small fractions with stirring. As soon as the suspension obtained is homogeneous, 3.43 g of a FAU-structure zeolite (CBV600 Zeolyst, SiO$_2$/Al$_2$O$_3$=5.48, LOI=12.65%) begins to be poured in and the suspension obtained is kept stirring for 5 minutes at room temperature. The reaction mixture then undergoes a step of maturing for 3 hours at room temperature with stirring (200 rpm). The SiO$_2$(Aerosil)/SiO$_2$ $_{(FAU)}$ molar ratio is 2.65. The precursor gel obtained has the following molar composition: 1 SiO$_2$: 0.05 Al$_2$O$_3$: 0.125R: 0.12 Na$_2$O: 27.55H$_2$O, i.e. an SiO$_2$/Al$_2$O$_3$ ratio of 20. 0.79 g of seeds of AFX-structure zeolite (8.7% relative to the mass of anhydrous CBV600 zeolite and of Aerosil 380 silica) are introduced into the precursor gel with stirring. The precursor gel containing the AFX zeolite seeds is then transferred into a 160 mL stainless steel reactor fitted with a stirring system with 4 inclined blades. The reactor is closed and then heated for 7 hours under autogenous pressure with an increase in temperature of 5° C./min up to 190° C. and with stirring at 200 rpm to allow the crystallization of the AFX-structure zeolite. The solid obtained is filtered off, washed with deionized water and then dried overnight at 100° C. The loss on ignition of the dried solid is 12.6%. The solid is then introduced into a muffle furnace where a calcination step is performed: the calcination cycle comprises an increase in temperature of 1.5° C./min up to 200° C., a hold at 200° C. maintained for 2 hours, an increase of 1° C./min up to 580° C., followed by a hold at 580° C. maintained for 10 hours, then a return to room temperature.

The calcined solid product was analysed by X-ray diffraction and identified as consisting of an AFX-structure zeolite with a purity of greater than 99% by weight. The X-ray diffraction pattern produced for the calcined solid is given in FIG. 2. The product has an $SiO_2/Al_2O_3$ molar ratio of 11.2 as determined by XRF.

The invention claimed is:

1. A process for preparing an AFX-structure zeolite comprising at least the following steps:
   i) mixing, in an aqueous medium, a FAU-structure zeolite having an SiO$_{2(FAU)}$/Al$_2$O$_3$ $_{(FAU)}$ molar ratio of between 2.00 and 100, a nitrogen-containing organic compound R, R being 1,6-bis(methylpiperidinium)hexane dihydroxide, at least one source of at least one alkali and/or alkaline-earth metal M of valence n, n being an integer greater than or equal to 1, chosen from lithium, potassium, sodium, magnesium and calcium and the mixture of at least two of these metals,
   the reaction mixture having the following molar composition:
   (SiO$_{2(FAU)}$)/(Al$_2$O$_3$ $_{(FAU)}$) between 2.00 and 100,
   H$_2$O/(SiO$_2$ $_{(FAU)}$) between 1 and 100,
   R/(SiO$_2$ $_{(FAU)}$) between 0.01 and 0.6,
   M$_{2/n}$O/(SiO$_2$ $_{(FAU)}$) between 0.005 and 0.45,
   wherein SiO$_2$ $_{(FAU)}$ denotes the amount of SiO$_2$ provided by the FAU zeolite, and Al$_2$O$_3$ (FAU) denotes the amount of Al$_2$O$_3$ provided by the FAU zeolite, then maturing the reaction mixture at a temperature between 20° C. and 80° C., with or without stirring, for a period of between 30 minutes and 24 hours, until a homogeneous precursor gel is obtained;

ii) hydrothermally treating the precursor gel obtained at the end of step i) under autogenous pressure at a temperature of between 120° C. and 250° C., for a time of between 4 hours and 12 hours.

2. The process as claimed in claim 1, wherein M comprises sodium, and the source of sodium is sodium hydroxide.

3. The process as claimed in claim 1, wherein the reaction mixture of step i) further comprises at least one source of an $XO_2$ oxide, X being one or more tetravalent elements chosen from the group formed by the following elements: silicon, germanium, titanium, such that the $XO_2/SiO_{2\ (FAU)}$ molar ratio is between 0.001 and 33, the $SiO_{2\ (FAU)}$ content in the ratio being the content provided by the FAU-structure zeolite.

4. The process as claimed in claim 3, wherein the reaction mixture of step i) has the following molar composition:
$(XO_2+SiO_{2\ (FAU)})/Al_2O_{3\ (FAU)}$ more than 2 to 100,
$H_2O/(XO_2+SiO_{2\ (FAU)})$ 1 to less than 100,
$R/(XO_2+SiO_{2\ (FAU)})$ 0.01 to less than 0.6,
$M_{2/n}O/(XO_2+SiO_{2\ (FAU)})$ 0.005 to less than 0.45.

5. The process as claimed in claim 4, wherein the reaction mixture of step i) has the following molar composition:
$(XO_2+SiO_{2\ (FAU)})/Al_2O_{3\ (FAU)}$ between 5.00 and 99,
$H_2O/(XO_2+SiO_{2\ (FAU)})$ between 5 and 60,
$R/(XO_2+SiO_{2\ (FAU)})$ between 0.1 and 0.4, and
$M_{2/n}O/(XO_2+SiO_{2\ (FAU)})$ between 0.07 and 0.22.

6. The process as claimed in claim 3, wherein X is silicon.

7. The process as claimed in claim 3, wherein the precursor gel obtained at the end of step i) has a molar ratio of the total amount expressed as oxides of tetravalent elements to the total amount expressed as oxides of trivalent elements of more than 2.00 to 100.

8. The process as claimed in claim 3, wherein the $XO_2/SiO_{2\ (FAU)}$ molar ratio is between 0.001 and 15.

9. The process as claimed in claim 1, wherein the reaction mixture of step i) further comprises at least one source of a $Y_2O_3$ oxide, Y being one or more trivalent elements chosen from the group formed by the following elements: aluminium, boron, gallium, such that the $Y_2O_3/Al_2O_{3\ (FAU)}$ molar ratio is between 0.001 and 45, limits included, the $Al_2O_{3\ (FAU)}$ content in the ratio being the content provided by the FAU-structure zeolite.

10. The process as claimed in claim 9, wherein the reaction mixture of step i) has the following molar composition:
$SiO_2(FAU)/(Al_2O_3(FAU)+Y_2O_3)$ 2.00 to less than 100,
$H_2O/(SiO_{2\ (FAU)})$ between 1 and 100,
$R/(SiO_{2\ (FAU)})$ between 0.01 and 0.6,
$M_{2/n}O/(SiO_{2\ (FAU)})$ between 0.005 and 0.45,
$SiO_{2\ (FAU)}$ being the amount of $SiO_2$ provided by the FAU zeolite and $Al_2O_{3\ (FAU)}$ being the amount of $Al_2O_3$ provided by the FAU zeolite.

11. The process as claimed in claim 10, wherein the reaction mixture of step i) has the following molar composition:
$SiO_2(FAU)/(Al_2O_3(FAU)+Y_2O_3)$ between 5.00 and 99,
$H_2O/(SiO_{2\ (FAU)})$ between 5 and 60,
$R/(SiO_{2\ (FAU)})$ between 0.1 and 0.4, and
$M_{2/n}O/(SiO_{2\ (FAU)})$ between 0.07 and 0.22.

12. The process as claimed in claim 9, wherein Y is aluminium.

13. The process as claimed in claim 9, wherein the $Y_2O_3/Al_2O_{3\ (FAU)}$ molar ratio is between 0.001 and 40, limits included.

14. The process as claimed in claim 1, wherein seed crystals of an AFX-structure zeolite are added to the reaction mixture of step i), in an amount of between 0.01% and 10% of the total mass of the sources of the tetravalent and trivalent element(s) in anhydrous form present in the reaction mixture, the seed crystals not being taken into account in the total mass of the sources of the tetravalent and trivalent elements.

15. The process as claimed in claim 1, wherein the hydrothermal treatment of step ii) is carried out at a temperature of between 150° C. and 230° C., for a period of 4 to less than 12 hours.

16. The process as claimed in claim 1, wherein a solid phase obtained at the end of step ii) is filtered off, washed, and dried at a temperature of between 20° C. and 150° C., for a period of between 5 and 24 hours, to obtain a dried zeolite.

17. The process as claimed in claim 16, wherein the dried zeolite is then calcined at a temperature of between 450° C. and 700° C. for a period of between 2 and 20 hours.

18. The process as claimed in claim 1, wherein the reaction mixture has the following molar composition:
$(SiO_{2\ (FAU)})/(Al_2O_{3\ (FAU)})$ between 5.00 and 99
$H_2O/(SiO_{2\ (FAU)})$ between 5 and 60
$R/(SiO_{2\ (FAU)})$ between 0.1 and 0.4 and
$M_{2/n}O/(SiO_{2\ (FAU)})$ between 0.07 and 0.22.

19. The process as claimed in claim 1, wherein maturing the reaction mixture at a temperature between 20° C. and 80° C., with or without stirring, is conducted for a period of between 1 and 12 hours until a homogeneous precursor gel is obtained.

20. The process as claimed in claim 1, wherein the hydrothermal treatment of step ii) is carried out at a temperature of between 150° C. and 230° C., for a period of 5 hours and 8 hours, and the solid phase obtained at the end of step ii) is filtered off, washed, and dried at a temperature of between 60° C. and 100° C., for a period of between 5 and 24 hours, to obtain a dried zeolite.

* * * * *